Patented Jan. 23, 1934

1,944,568

UNITED STATES PATENT OFFICE 1,944,568

PROCESS FOR THE MANUFACTURE OF AROMATIC SULPHODIHALOGENAMIDES

Hans Mirau, Radebeul, Germany, assignor to Chemische Fabrik von Heyden, A. G., Radebeul, near Dresden, Germany, a corporation of Germany No Drawing. Application May 18, 1931, Serial No. 538,250, and in Germany June 27, 1930

8 Claims. (Cl. 260—158)

For the production of aromatic sulphodichloramides practically the only process known up to now consisted in acting upon the aqueous solutions of the salts of the sulphomonochloramides with a mineral acid or acetic acid.

The products obtained by aforesaid process are very liable to decomposition for the reason that traces of acid are tenaciously adhering to the product, this acid catalytically accelerating the splitting off of the chlorine. The sulphodichloramides produced by the above process mostly represent a liquid of oily character.

I have now found that aromatic sulphodichloramides of great stability are obtained if I act upon the aromatic sulphoamides, or their monohalogen compounds, for instance the monosulphohalogen compounds of the same, with an alkali-metal hypochlorite, such as sodium hypochlorite, and carbonic acid under pressure; in case the monosulphohalogen compounds are applied for the process, water is added to the mixture of the substances cited above.

The advantage of this process consists in causing the generation of the sulphodihalogenamide, instead of in a solution of acid reaction, in a solution of alkaline reaction, on account of the presence of the generated sodium bicarbonate.

The following (Equation 1) illustrates the reaction taking place between an aromatic sulphoamide, such as p-toluene-sulphoamide, sodium hypochlorite and carbon dioxide; (Equation #2) illustrates the reaction between an aromatic sulphomonochloramide, such as p-toluene-sulphomonochloramide and the other substances pointed out above, water being added to the reaction mixture; the equations read as follows:

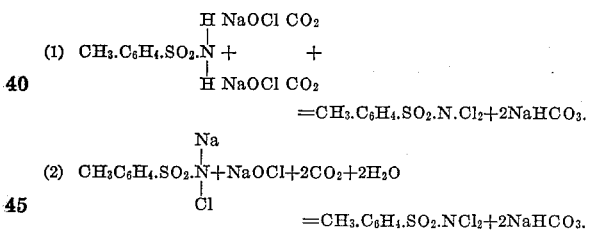

It could not be anticipated that this process would give a quantitative yield, because it is known that it is possible to transform sulphodichloramides into the corresponding monochloramides by acting on the aforesaid sulphodichloramides with an aqueous solution of salts of alkaline reaction.

The above described new process is also economically of considerable advantage over the prior art inasmuch as the mother lyes, remaining from the reaction, by heating may be deprived of the excess of carbon dioxide held by them, whereupon they are acted upon with chlorine to transform them again into sodium-hypochlorite solutions, which can be readily applied over again in the process.

For the better understanding of my invention I am going to describe by a few examples how I may proceed to put the same into effect.

Example I 25 parts of p-toluene-sulphoamide are suspended in 600 parts of water and to the mixture there are then added 165 parts, by volume, of a bleaching liquor of 13,7% active chlorine. The whole mixture is then agitated in a digester into which carbon dioxide gas is introduced by means of a compressor. The pressure within the digester may vary within a wide range above atmospheric pressure, usually a pressure of from 20 to 30 atmospheres has been found convenient in its operation.

The process, carried on according to the above directions, yields 35 parts of pure p-toluenesulphodichloramide.

Example II 30 parts of p-toluenesulphochloramide-sodium are disolved in 500 parts of water and after adding 100 parts, by volume, of a 14,7% bleaching liquor the whole mixture is acted upon in a digester with carbon dioxide gas, the mixture being vigorously agitated during the reaction. Otherwise the reaction is carried on as described by Example 1. I obtain under the conditions of this example approximately 42 parts of pure p-toluenesulphodichloramide of the well known properties.

Example III

A solution is prepared of 25 parts of benzolsulphoamide with 600 parts of water and 180 parts, by volume, of a 13,7% bleaching liquor, which solution is then acted upon with carbon dioxide gas under pressure. The mixture is otherwise treated as described in above Examples I and II.

The reaction yields approximately 35 parts of benzolsulphodichloramide.

I have stated above in the introduction that water is added to the mixture in order to bring about the reaction between the salts of the sulphomonohalogenamides; this amount of water, two molecules is necessary for the said salts of the sulphomonohalogenamides to cause the formation of the sodium-bicarbonate. This amount of water is not necessary, however, in the case of the sulphoamides, as the hydrogen of the amide group furnishes the hydrogen required for the generation of the sodium bicarbonate; the water, in which the aromatic sulphoamide is suspended, is merely the vehicle for the same.

It was also stated above that in contradistinction to the prior art my new process is operated in an alkaline solution owing to the generated sodium bicarbonate.

What I claim is:

1. The process of manufacturing aromatic sulphodichloramides of the benzene series, said process comprising acting upon an aromatic sulphoamide of said series with an alkali-metal hypochlorite, and introducing carbon dioxide into the mixture of aforesaid substances.

2. The process of manufacturing aromatic sulphodichloramides of the benzene series, said process comprising acting upon an aromatic sulphoamide of said series with an alkali-metal hypochlorite under pressure, and introducing carbon dioxide into the mixture of aforesaid substances.

3. The process of manufacturing aromatic sulphodichloramides of the benzene series, said process comprising acting upon an aromatic sulphoamide of said series, suspended in water, with an alkali-metal hypochlorite, and introducing carbon dioxide into the mixture of aforesaid substances.

4. The process of manufacturing aromatic sulphodichloramides of the benzene series, said process comprising acting upon an aromatic sulphoamide of said series in the solution of a salt of alkaline reaction with an alkali-metal hypochlorite, and introducing carbon dioxide into the mixture of aforesaid substances.

5. The process of manufacturing aromatic sulphodichloramides of the benzene series, said process comprising acting upon an aromatic sulphoamide of said series in the solution of sodium bicarbonate with sodium hypochlorite, and introducing carbon dioxide into the mixture of aforesaid substances.

6. The process of manufacturing aromatic sulphodichloramides of the benzene series, said process comprising acting upon the aqueous solution of a salt of an aromatic sulphomonochloramide of said series with an alkali-metal hypochlorite, and introducing carbon dioxide into the mixture of aforesaid substances.

7. The process of manufacturing aromatic sulphodichloramides of the benzene series, said process comprising acting upon the aqueous solution of a salt of an aromatic sulphomonochloramide of said series with an alkali-metal hypochlorite under pressure, and introducing carbon dioxide into the mixture of aforesaid substances.

8. The process of manufacturing aromatic sulphodichloramides of the benzene series, said process comprising acting upon the aqueous solution of an alkali-metal salt of an aromatic sulphomonochloramide of said series under pressure with an alkali-metal hypochlorite, and introducing carbon dioxide into the mixture of aforesaid substances.

HANS MIRAU.